US011878758B2

(12) United States Patent
Wen

(10) Patent No.: US 11,878,758 B2
(45) Date of Patent: Jan. 23, 2024

(54) BOTTLE HOLDER

(71) Applicant: Yuan-Hung Wen, Chang Hua County (TW)

(72) Inventor: Yuan-Hung Wen, Chang Hua County (TW)

(*) Notice: Subject to any disclaimer, the term of this patent is extended or adjusted under 35 U.S.C. 154(b) by 96 days.

(21) Appl. No.: 17/567,339

(22) Filed: Jan. 3, 2022

(65) Prior Publication Data
US 2023/0211847 A1 Jul. 6, 2023

(51) Int. Cl.
B62J 11/04 (2020.01)

(52) U.S. Cl.
CPC ..................... B62J 11/04 (2020.02)

(58) Field of Classification Search
CPC .............. B62J 11/04; A45F 2200/0583; A45F 2005/025; A45F 2005/026; A45F 2005/027; A45F 2005/028
USPC ............. 224/414, 148.1–148.6; 248/220.21, 248/222.52, 223.31, 223.41, 311.2
See application file for complete search history.

(56) References Cited

U.S. PATENT DOCUMENTS

| | | | | |
|---|---|---|---|---|
| 5,996,957 A * | 12/1999 | Kurtz | ................. | A47G 23/0225 248/231.21 |
| 8,469,248 B2 * | 6/2013 | Weng | ...................... | B62J 11/04 224/547 |
| 8,919,623 B1 * | 12/2014 | Bergeron | .................. | A45F 5/02 224/159 |
| 10,328,983 B2 * | 6/2019 | Fiedler | ..................... | B62J 11/04 |
| 10,703,429 B2 * | 7/2020 | Fiedler | .................... | F16M 13/02 |
| 11,617,431 B2 * | 4/2023 | Cheng | ..................... | A45F 5/021 224/661 |
| 2023/0084084 A1 * | 3/2023 | Ycas | ........................ | B62J 11/04 248/311.2 |
| 2023/0158936 A1 * | 5/2023 | Kelk | ...................... | B60N 3/102 248/311.2 |

FOREIGN PATENT DOCUMENTS

WO  WO-2021019424 A1 * 2/2021 ............. B62J 11/04

* cited by examiner

Primary Examiner — Justin M Larson
(74) Attorney, Agent, or Firm — Muncy, Geissler, Olds & Lowe, P.C.

(57) ABSTRACT

A bottle holder is provided, including: a base, including a first restriction portion; a rack, configured for mounting of a bottle, including a connection portion, the connection portion including a second restriction portion, the connection portion being rotatable about an axial portion between an initial position and a first operation position relative to the base, defining a first rotation direction from the initial position to the first operation position; and a restoring member, connected between the base and the connection portion; wherein when the connection portion is in the initial position, the first restriction portion is blocked by the second restriction portion in a direction opposite to the first rotation direction.

9 Claims, 7 Drawing Sheets

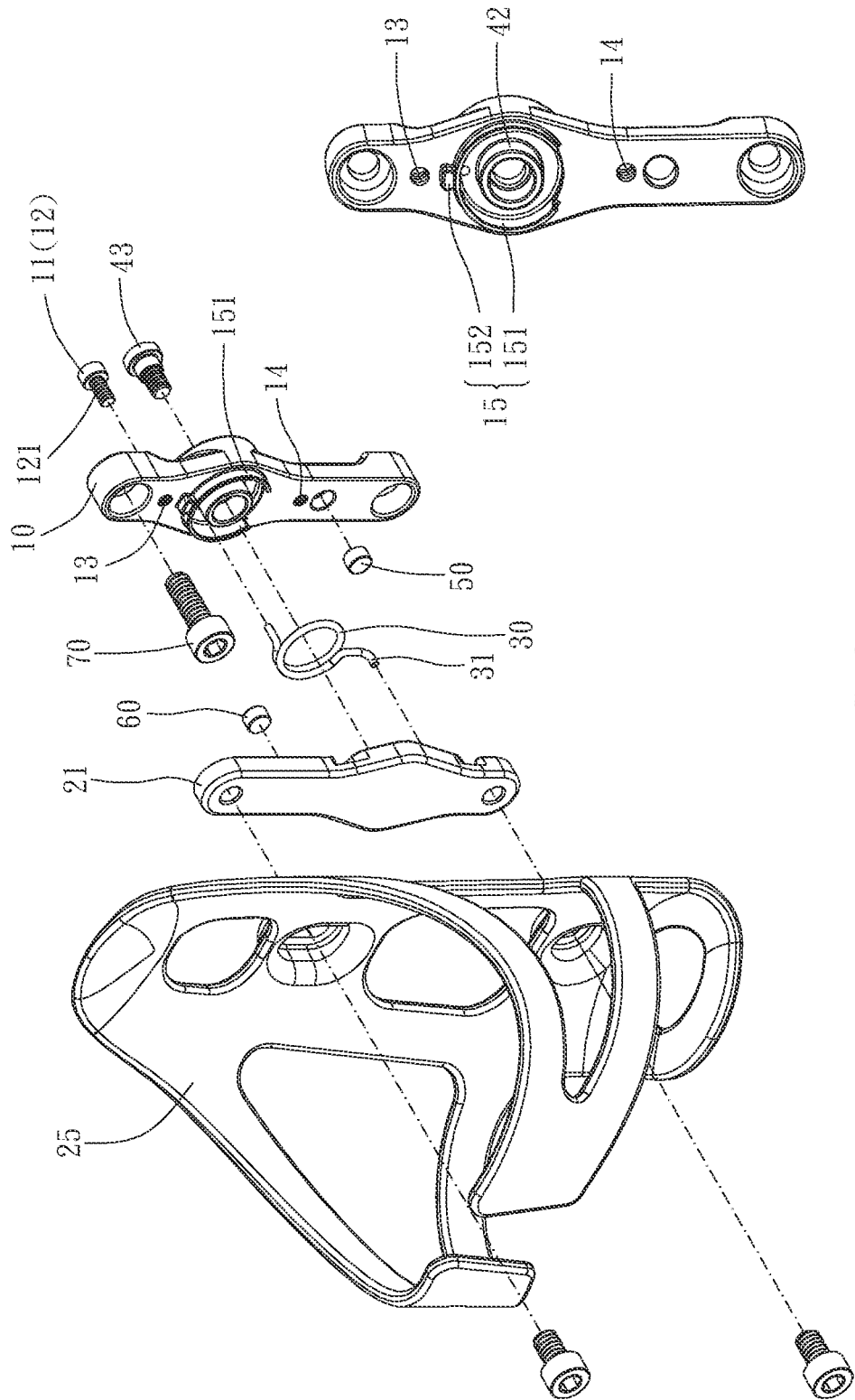

BOTTLE HOLDER

BACKGROUND OF THE INVENTION

Field of the Invention

The present invention relates to a bottle holder.

Description of the Prior Art

A bottle holder is often installed on a bicycle frame for holding a bottle. When being thirsty during the ride, the rider can take out the bottle to drink conveniently.

The conventional bottle holder is fixed to the bicycle frame with its opening toward a direction parallel to a tube of the bicycle frame such that the bottle has to be installed and taken out in the direction parallel to the tube of the bicycle frame, which results in limitation of the surrounding environment and space and makes it easy to be interfered by the bicycle frame when removing and taking out the bottle. As a result, it is difficult to install the bottle onto the bicycle frame or take out the bottle from the bicycle frame.

The present invention is, therefore, arisen to obviate or at least mitigate the above-mentioned disadvantages.

SUMMARY OF THE INVENTION

The main object of the present invention is to provide a bottle holder which is unidirectionally swingable.

To achieve the above and other objects, a bottle holder is provided, including: a base, including a first restriction portion; a rack, configured for mounting of a bottle, including a connection portion, the connection portion including a second restriction portion, the connection portion being rotatable about an axial portion between an initial position and a first operation position relative to the base, defining a first rotation direction from the initial position to the first operation position; and a restoring member, connected between the base and the connection portion; wherein when the connection portion is in the initial position, the first restriction portion is blocked by the second restriction portion in a direction opposite to the first rotation direction.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 3 is another breakdown drawing of a preferable embodiment of the present invention;

FIG. 4 is a stereogram of a base according to a preferable embodiment of the present invention;

DETAILED DESCRIPTION OF THE PREFERRED EMBODIMENTS

Figure 1:
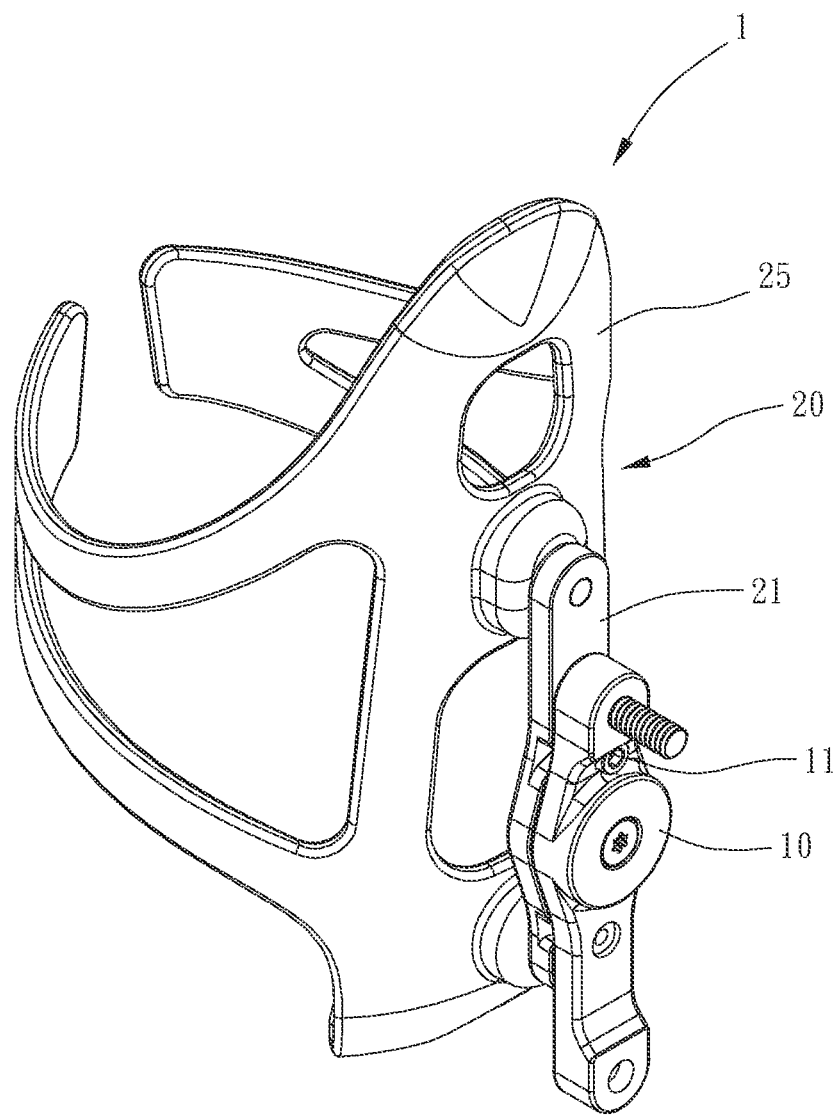
FIG. 1 is a stereogram of a preferable embodiment of the present invention.
Figure 2:
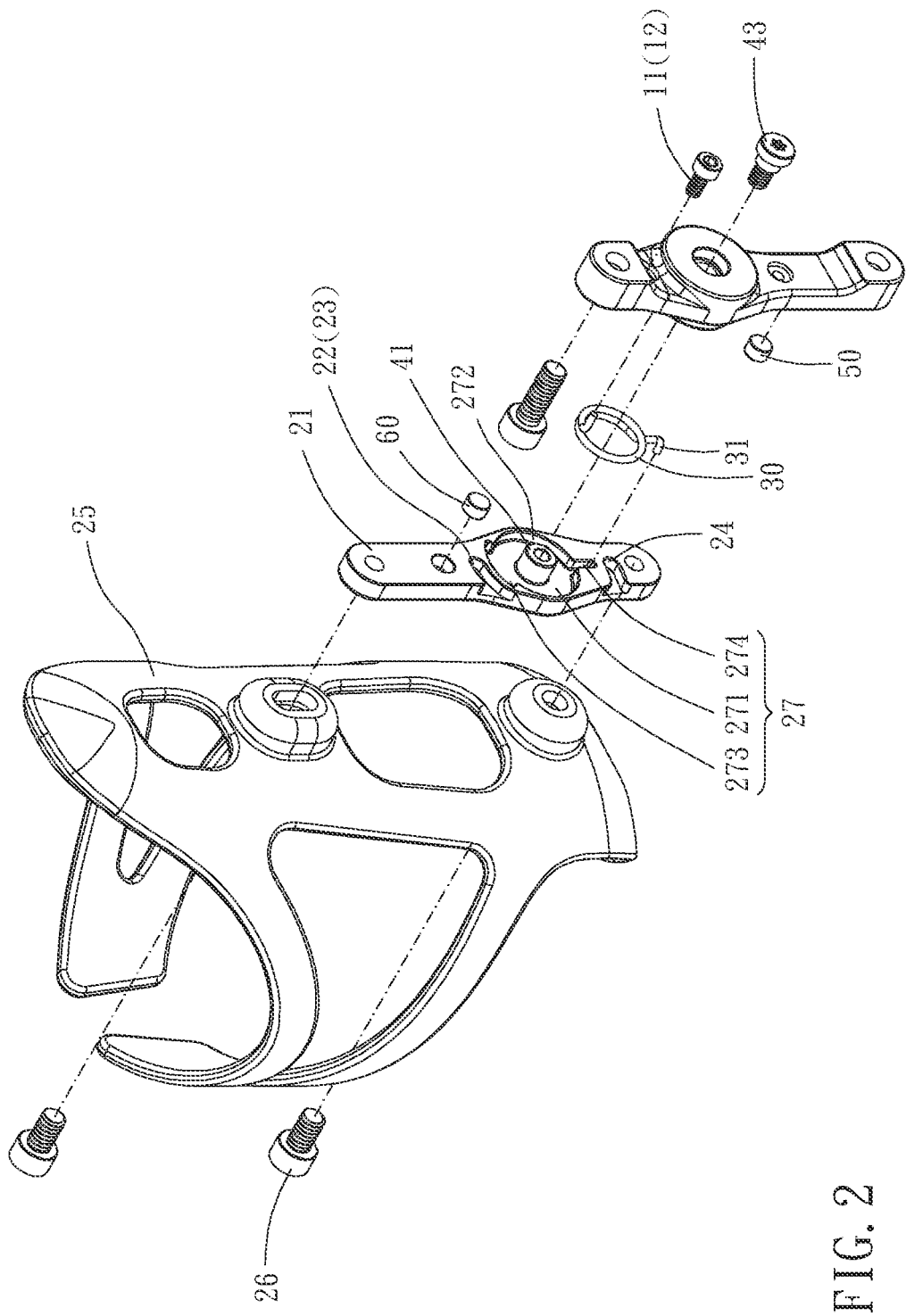
FIG. 2 is a breakdown drawing of a preferable embodiment of the present invention.
Figure 5:
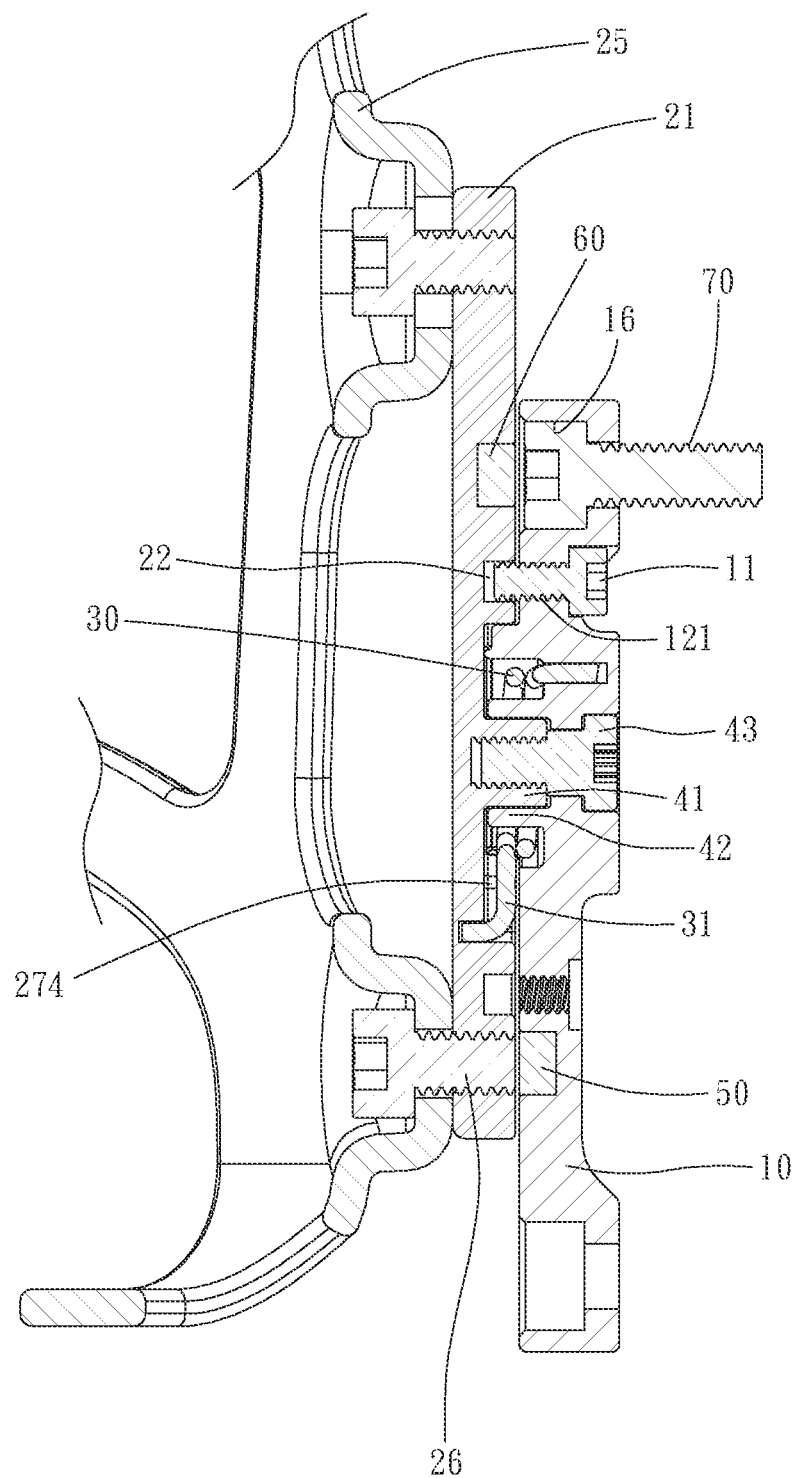
FIG. 5 is a cross-sectional view of a preferable embodiment of the present invention.
Figure 6:
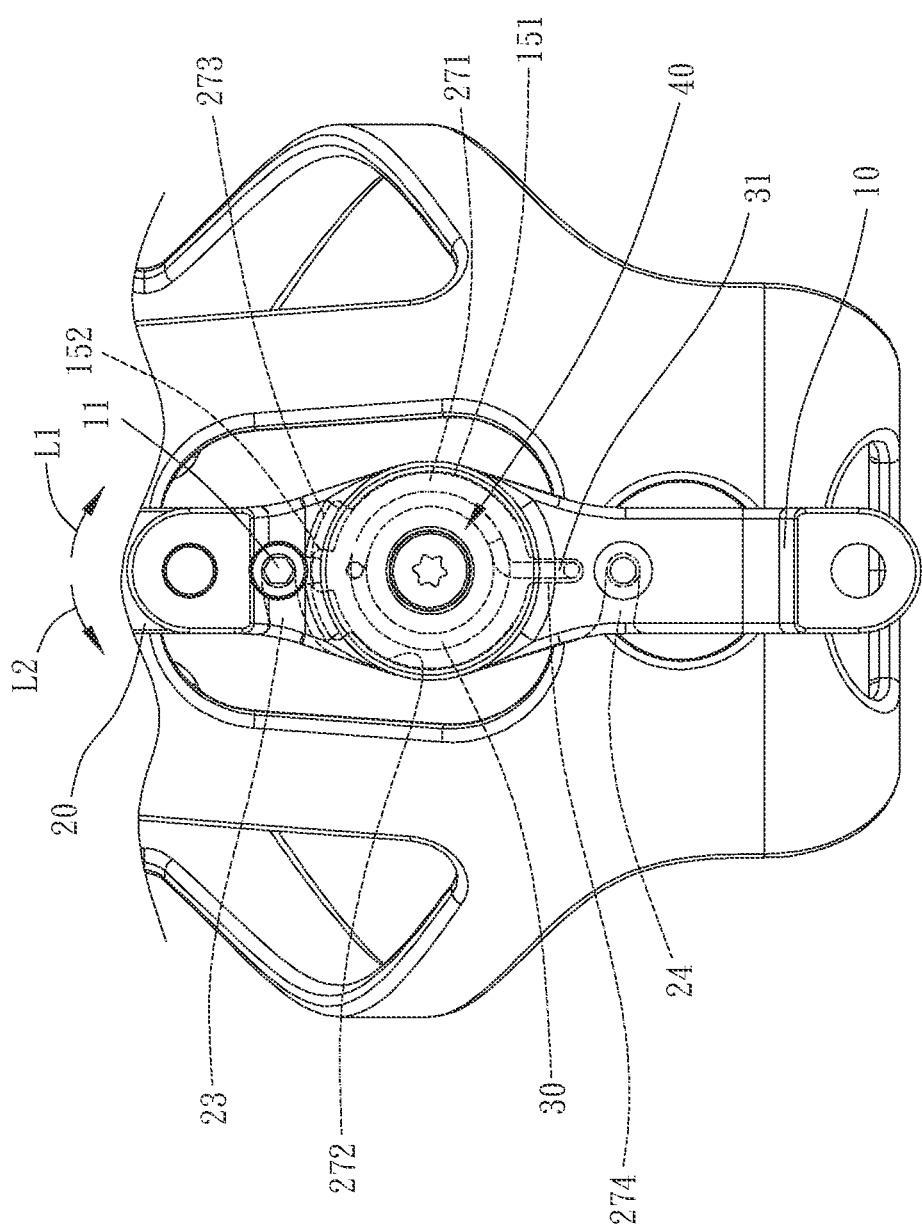
FIG. 6 is a drawing showing a connection portion located in an initial position according to a preferable embodiment of the present invention.
Figure 7:
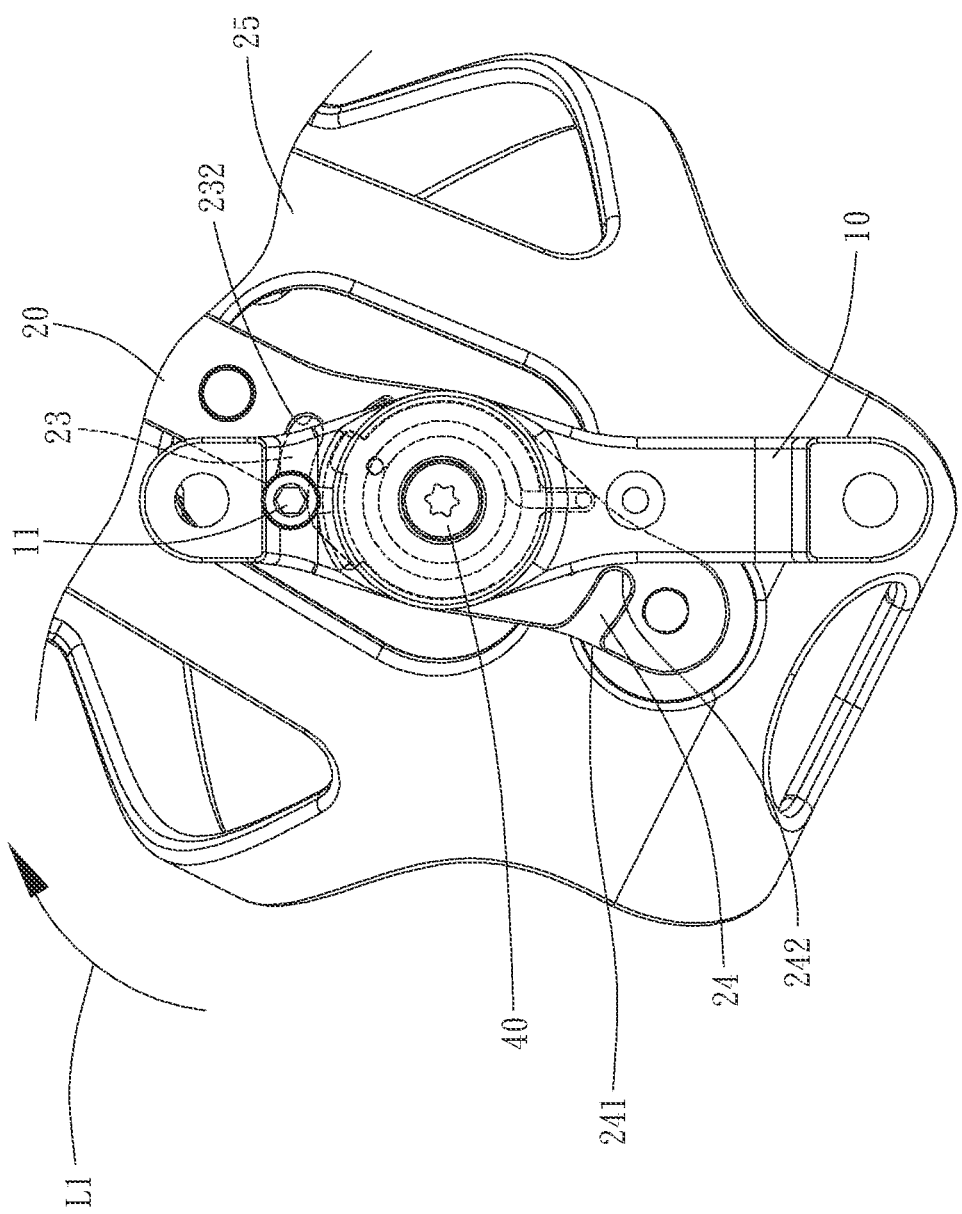
FIG. 7 is a drawing showing the connection portion located in a first operation position according to a preferable embodiment of the present invention.
Figure 8:
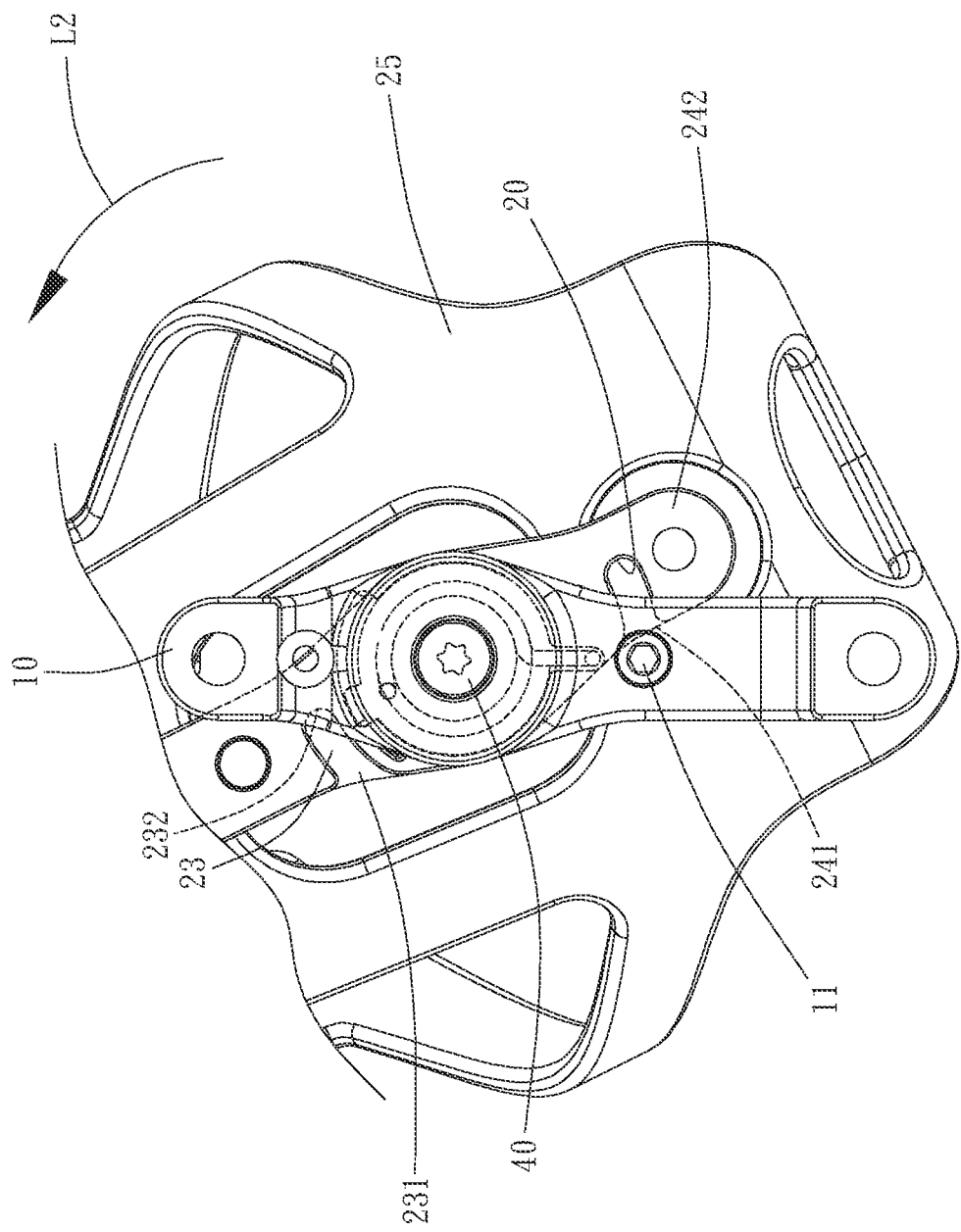
FIG. 8 is a drawing showing the connection portion located in a second operation position according to a preferable embodiment of the present invention.

Please refer to FIGS. 1 to 8 for a preferable embodiment of the present invention. A bottle holder 1 of the present invention includes a base 10, a rack 20 and a restoring member 30.

The base 10 includes a first restriction portion 11; the rack 20 is configured for mounting of a bottle, the rack 20 includes a connection portion 21, the connection portion 21 includes a second restriction portion 22, the connection portion 21 is rotatable about an axial portion 40 between an initial position (FIG. 6) and a first operation position (FIG. 7) relative to the base 10, and a rotation direction from the initial position to the first operation position is defined as a first rotation direction L1; the restoring member 30 is connected between the base 10 and the connection portion 21. In this embodiment, the restoring member 30 is a coil spring; however, the restoring member may be elastic rod, plate or the like. When the connection portion 21 is in the initial position, the first restriction portion 11 is blocked by the second restriction portion 22 in a direction opposite to the first rotation direction L1. In this embodiment, the connection portion 21 is rotatable about the axial portion 40 between the initial position, the first operation position and a second operation position (FIG. 8) relative to the base 10, a rotation direction from the initial position to the second operation position is defined as a second rotation direction L2, the first rotation direction L1 is opposite to the second rotation direction L2, and when the connection portion 21 is in the initial position, the second restriction portion 22 is blocked by the first restriction portion 11 in the second rotation direction L2 such that the rack 20 cannot rotate in the second rotation direction L2 in the initial position. Whereby, in the initial position the rack 20 can only rotate unidirectionally relative to the base 10 and can automatically recovery to the initial position, which is advantageous for taking the bottle through rotating the rack 20 for an angle.

The first restriction portion 11 is detachably connected with the base 10, or the second restriction portion 22 is detachably connected with the connection portion 21. In this embodiment, the first restriction portion 11 is detachably connected with the base 10 so that it can be optional to make the rack 20 unidirectionally swingable.

One of the first restriction portion 11 and the second restriction portion 22 includes a groove 23, the other of the first restriction portion 11 and the second restriction portion 22 includes a projection 12, the projection 12 is movably disposed within the groove 23, and the groove 23 extends around the axial portion 40. The groove 23 includes an open end 231 and a blocking end 232 opposite to the open end 231, the open end 231 is open toward the first rotation direction L1 or the second rotation direction L2, and the projection 12 is blockable by the blocking end 232. The first restriction portion 11 includes the projection 12, the second restriction portion 22 includes the groove 23, the connection portion 21 further includes a third restriction portion 24, and the third restriction portion 24 and the second restriction portion 22 are located at two opposite sides of the axial portion 40. The third restriction portion 24 includes a guiding groove, and the guiding groove includes an opening 241 and a distal end 242 opposite to the opening 241. One of the opening 241 and the open end 231 is open toward the first rotation direction L1, and the other of the opening 241 and the open end 231 is open toward the second rotation direction L2. In this embodiment, the open end 231 is open toward the second rotation direction L2, the opening 241 is open toward the first rotation direction L1. The base 10 further includes a first assembling portion 13 and a second assembling portion 14, and the first assembling portion 13 and the second assembling portion 14 are located at different positions of the base 10. The first restriction portion 11 is detachably disposed on the first assembling portion 13 where the first restriction portion 11 is engaged within the groove 23 or the first restriction portion 11 is detachably disposed on the second assembling portion 14 where the first restriction portion 11 is engaged within the guiding groove. If the first restriction portion 11 is disposed on the first assembling portion 13, the rack 20 can swing in the first rotation direction L1 till the first operation position; if the first restriction portion 11 is disposed on the second assembling portion 14, the rack 20 can swing in the second rotation direction L2 till the second operation position. In this embodiment, each of the first assembling portion 13 and the second assembling portion 14 includes a threaded hole, the projection 12 includes a threaded portion 121, and the threaded portion 121 is screwed within the threaded hole. Specifically, the projection 12 is a screw, which is easy to assemble/disassemble and adjust.

The bottle holder 1 further includes a first magnetic member 50, the rack 20 further includes a carrier 25 and a magnetism attractable connecting member 26, the carrier 25 configured is configured for mounting of the bottle, the magnetism attractable connecting member 26 is detachably connected with the carrier 25 and the connection portion 21, the carrier 25 is rotatable with the connection portion 21, and the first magnetic member 50 is disposed on the base 10. When the connection portion 21 is in the initial position, the first magnetic member 50 and the magnetism attractable connecting member 26 correspond to each other and attract each other. Preferably, the bottle holder 1 further includes a second magnetic member 60, the second magnetic member 60 is disposed on the connection portion 21, and the second magnetic member 60 and the first magnetic member 50 are located at opposite sides of the axial portion 40. The base 10 further includes a through hole 16, the through hole 16 is configured for receiving a magnetism attractable threaded member 70, and the magnetism attractable threaded member 70 is configured to be detachably disposed through the base 10 and connected to a bicycle frame. When the connection portion 21 is in the initial position, the second magnetic member 60 corresponds to the through hole 16 and attracts the magnetism attractable threaded member 70 such that the rack 20 is not rotatable relative to the base 10 until a sufficient external force is applied to the rack 20. Preferably, each of the first magnetic member 50 and the second magnetic member 60 is a magnet, and each of the magnetism attractable connecting member 26 and the magnetism attractable threaded member 70 is a magnetism attractable screw.

One of the base 10 and the connection portion 21 includes a recess 27, and the other of the base 10 and the connection portion 21 includes a protrusion 15. In this embodiment, the base 10 includes the protrusion 15, the connection portion includes the recess 27, the recess 27 includes a receiving space 271 and a circumferential wall 272, the circumferential wall 272 extends around the axial portion 40 and defines the receiving space 271, the protrusion 15 includes an arcuate flange 151 extending around the axial portion 40, the arcuate flange 151 is engaged within the receiving space 271, and the arcuate flange 151 and the circumferential wall 272 contact each other and are rotatable relative to each other. The recess 27 further includes a restriction groove 273, the restriction groove 273 extends around the axial portion 40 and is in communication with the receiving space 271, the protrusion 15 further includes a restriction block 152, the restriction block 152 projects radially form the arcuate flange 151, and the restriction block 152 is movably engaged within the restriction groove 273. The recess 27 further includes a notch 274, and the notch 274 extends radially from and is in communication with the receiving space 271. The restoring member 30 includes two arm portions 31, the two arm portions 31 are respectively connected with the connection portion 21 and the base 10, and the restoring member 30 is received in the receiving space 271. One of the two arm portions 31 is disposed within the notch 274, which prevents the connection portion 21 from over swinging, and stabilizes rotational and restoring movement of the rack 20.

The axial portion 40 includes a shaft 41, a sleeve 42 and a securing member 43. One of the shaft 41 and the sleeve 42 projects form the base 10, and the other of the shaft 41 and the sleeve 42 projects form the connection portion 21. The sleeve 42 is disposed around the shaft 41, the shaft 41 is abutted radially against the sleeve 42, and the securing member 43 is disposed through the sleeve 42 and connected with the shaft 41, which provides good support and smooth rotation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bottle holder, including:
   a base, including a first restriction portion;
   a rack, configured for mounting of a bottle, including a connection portion, the connection portion including a second restriction portion, the connection portion being rotatable about an axial portion between an initial position and a first operation position relative to the base, defining a first rotation direction from the initial position to the first operation position; and
   a restoring member, connected between the base and the connection portion;
   wherein when the connection portion is in the initial position, the first restriction portion is blocked by the second restriction portion in a direction opposite to the first rotation direction;
   wherein the connection portion is rotatable about the axial portion between the initial position, the first operation position and a second operation position relative to the base, a rotation direction from the initial position to the second operation position is defined as a second rotation direction, the first rotation direction is opposite to the second rotation direction, and when the connection portion is in the initial position, the second restriction portion is blocked by the first restriction portion in the second rotation direction; the first restriction portion is detachably connected with the base, or the second restriction portion is detachably connected with the connection portion.

2. The bottle holder of claim 1, wherein the axial portion includes a shaft, a sleeve and a securing member, one of the shaft and the sleeve projects form the base, the other of the shaft and the sleeve projects form the connection portion, the sleeve is disposed around the shaft, and the securing member is disposed through the sleeve and connected with the shaft.

3. The bottle holder of claim 1, wherein one of the base and the connection portion includes a recess, the other of the base and the connection portion includes a protrusion, the recess includes a receiving space and a circumferential wall, the circumferential wall extends around the axial portion and defines the receiving space, the protrusion includes an arcuate flange extending around the axial portion, the arcuate flange is engaged within the receiving space, and the arcuate flange and the circumferential wall contact and are relatively rotatable.

4. The bottle holder of claim 3, wherein the recess further includes a restriction groove, the restriction groove extends around the axial portion and is in communication with the receiving space, the protrusion further includes a restriction block, the restriction block projects radially form the arcuate flange, and the restriction block is movably engaged within the restriction groove.

5. A bottle holder, including:
a base, including a first restriction portion;
a rack, configured for mounting of a bottle, including a connection portion, the connection portion including a second restriction portion, the connection portion being rotatable about an axial portion between an initial position and a first operation position relative to the base, defining a first rotation direction from the initial position to the first operation position; and
a restoring member, connected between the base and the connection portion;
wherein when the connection portion is in the initial position, the first restriction portion is blocked by the second restriction portion in a direction opposite to the first rotation direction;
wherein one of the first restriction portion and the second restriction portion includes a groove, the other of the first restriction portion and the second restriction portion includes a projection, the projection is movably disposed within the groove, the groove extends around the axial portion, the groove includes an open end and a blocking end opposite to the open end, the open end is open toward the first rotation direction or the second rotation direction, and the projection is blockable by the blocking end.

6. The bottle holder of claim 5, wherein the first restriction portion includes the projection, the second restriction portion includes the groove, the connection portion further includes a third restriction portion, the third restriction portion includes a guiding groove, the guiding groove includes an opening and a distal end opposite to the opening, one of the opening and the open end is open toward the first rotation direction, and the other of the opening and the open end is open toward the second rotation direction; the base further includes a first assembling portion and a second assembling portion, the first assembling portion and the second assembling portion are located at different positions of the base, and the first restriction portion is detachably disposed on the first assembling portion where the first restriction portion is engaged within the groove or the first restriction portion is detachably disposed on the second assembling portion where the first restriction portion is engaged within the guiding groove.

7. The bottle holder of claim 6, wherein each of the first assembling portion and the second assembling portion includes a threaded hole, the projection includes a threaded portion, and the threaded portion is screwed within the threaded hole.

8. The bottle holder of claim 7, wherein the connection portion is rotatable about the axial portion between the initial position, the first operation position and a second operation position relative to the base, a rotation direction from the initial position to the second operation position is defined as a second rotation direction, the first rotation direction is opposite to the second rotation direction, and when the connection portion is in the initial position, the second restriction portion is blocked by the first restriction portion in the second rotation direction; the first restriction portion is detachably connected with the base, or the second restriction portion is detachably connected with the connection portion; the bottle holder further includes a first magnetic member, the rack further includes a carrier and a magnetism attractable connecting member, the carrier is configured for mounting of the bottle, the magnetism attractable connecting member is detachably connected with the carrier and the connection portion, the carrier is rotatable with the connection portion, and the first magnetic member is disposed on the base; when the connection portion is in the initial position, the first magnetic member and the magnetism attractable connecting member correspond to each other and attract each other; the bottle holder further includes a second magnetic member, the second magnetic member is disposed on the connection portion, the second magnetic member and the first magnetic member are located at opposite sides of the axial portion, the base further includes a through hole, the through hole is configured for receiving a magnetism attractable threaded member, when the connection portion is in the initial position, the second magnetic member corresponds to the through hole and attracts the magnetism attractable threaded member; one of the base and the connection portion includes a recess, the other of the base and the connection portion includes a protrusion, the recess includes a receiving space and a circumferential wall, the circumferential wall extends around the axial portion and defines the receiving space, the protrusion includes an arcuate flange extending around the axial portion, the arcuate flange is engaged within the receiving space, and the arcuate flange and the circumferential wall contact each other and are rotatable relative to each other; the recess further includes a restriction groove, the restriction groove extends around the axial portion and is in communication with the receiving space, the protrusion further includes a restriction block, the restriction block projects radially form the arcuate flange, and the restriction block is movably engaged within the restriction groove; the recess further includes a notch, the notch extends radially from and is in communication with the receiving space, the restoring member includes two arm portions, the two arm portions are respectively connected with the connection portion and the base, the restoring member is received in the receiving space, one of the two arm portions is disposed within the notch; the axial portion includes a shaft, a sleeve and a securing member, one of the shaft and the sleeve projects form the base, the other of the shaft and the sleeve projects form the connection portion, the sleeve is disposed around the shaft, and the securing member is disposed through the sleeve and connected with the shaft; the third restriction portion and the second restriction portion are located at opposite sides of the axial portion.

9. A bottle holder, including:
a base, including a first restriction portion;
a rack, configured for mounting of a bottle, including a connection portion, the connection portion including a second restriction portion, the connection portion being rotatable about an axial portion between an initial position and a first operation position relative to the base, defining a first rotation direction from the initial position to the first operation position;
a restoring member, connected between the base and the connection portion; and
a first magnetic member;
wherein when the connection portion is in the initial position, the first restriction portion is blocked by the second restriction portion in a direction opposite to the first rotation direction;
wherein the rack further includes a carrier and a magnetism attractable connecting member, the carrier is configured for mounting of the bottle, the magnetism attractable connecting member is detachably connected with the carrier and the connection portion, the carrier is rotatable with the connection portion, and the first magnetic member is disposed on the base; when the connection portion is in the initial position, the first magnetic member and the magnetism attractable connecting member correspond to each other and attract each other.

* * * * *